United States Patent Office 3,592,878
Patented July 13, 1971

3,592,878
COMPOSITIONS COMPRISING A HIGH CIS GRAFT COPOLYMER AND A HIGH TRANS GRAFT COPOLYMER
Zygmunt Kromolicki, Bramhall, England, assignor to Sterling Moulding Materials Limited, London, England
No Drawing. Filed June 23, 1967, Ser. No. 648,212
Claims priority, application Great Britain, June 24, 1966, 28,552/66
Int. Cl. C08f 41/12
U.S. Cl. 260—876
7 Claims

ABSTRACT OF THE DISCLOSURE

Homogeneous mixtures of a high cis polybutadiene graft polymer with a vinyl aromatic compound, a polymer or copolymer of a vinyl aromatic compound, and a high trans diene hydrocarbon graft polymer with a vinyl aromatic compound are provided, which provide an unexpected combination of high impact strength, high tensile strength and high softening point together with good surface gloss of mouldings; the vinyl aromatic compound is preferably styrene or mixtures with α-methyl styrene.

---

This invention is for improvements in or relating to synthetic resin compositions and describes the production of a ternary blend of polymers, more especially the production of blends of two graft polymers and a copolymer of a vinyl aromatic hydrocarbon.

In prior British Pat. No. 1,030,497, there is described a process for the production of graft polymers of vinyl aromatic compounds on a linear polybutadiene rubber.

In copending British Pat. No. 1,074,322 there is described improved graft polymers of vinyl aromatic hydrocarbons on a diene hydrocarbon having a high trans isomer content and crosslinked with a minor amount of a difunctional vinyl aromatic compound.

It has now been found that polymers with improved physical properties are obtained when a ternary blend is made of the graft polymer as produced according to British Pat. No. 1,030,497, a vinyl aromatic polymer or copolymer and a graft polymer of a vinyl aromatic hydrocarbon on a rubbery polymer of a diene hydrocarbon, having a high trans content and obtained by emulsion polymerisation.

According to the present invention there is provided a homogeneous mixture of a first graft polymer of a linear polybutadiene having a minimum cis isomer content of 30% with a vinyl aromatic compound, a polymer or copolymer of a vinyl aromatic compound and a second graft polymer of a rubbery polymer of a diene hydrocarbon having a high trans isomer content with a vinyl aromatic compound. The preferred proportions of the three polymers in the blend will all lie within the range of 15% to 70% by weight of the blend. The diene hydrocarbon polymer is preferably a polybutadiene produced by an emulsion polymerisation technique. The vinyl aromatic compound employed is preferably styrene with or without α-methyl styrene but other nuclear alkyl or halogen substituted styrenes, such as meta-methyl styrene and o-chlorostyrene, may be employed. The polybutadiene rubber is a linear, amorphous polymer having a minimum cis isomer content of 30%, which is dissolved in styrene monomer and the solution heated in the presence of peroxide catalysts producing the first graft polymer as a toughened polystyrene polymer; the second graft polymer is based on an emulsion type butadiene polymer, having a high trans isomer content and the polybutadiene is essentially crosslinked, this latex is then grafted by reacting with a monovinyl aromatic monomer using a peroxide catalyst, it is then coagulated and dried; the three polymers are then blended and compounded in a Banbury Mixer or a Buss Ko Kneader.

In the following description the percentage figures quoted are calculated by weight:

EXAMPLE 1

The rubbery polymer is prepared from butadiene under polymerisation conditions such as to obtain a high cis content (at least 30%). Such polybutadienes are available on the market under the trade names: "Budene," "Diene," "Taktene." The rubber is dissolved in styrene monomer and it is polymerised in the presence of a plurality of peroxygen compounds as described in British Pat. No. 1,030,497. The final product is a toughened polystyrene, being essentially a two-phase system, and having the polybutadiene rubber grafted with styrene monomer, dispersed as small particles within the range of 0.5 to 30 microns in the polystyrene matrix. This product is referred to in the succeeding examples as "Mass Graft Polymer A."

Whilst the above graft polymer is prepared by the mass polymerisation method, the second graft polymer is made using the emulsion polymerisation method. Butadiene is dispersed in an aqueous medium and is polymerised in the presence of 1% of potassium oleate and using potassium persulphate as catalyst and temperatures between 50° C. and 70° C. are normally used. The polymerisation is taken to high conversions, up to 90%, when the residual monomer is allowed to distill off. Thus prepared, the polybutadiene is non-linear, has a trans content above 60% and is also crosslinked, which can be measured by solubility tests and measuring the swelling index of the rubber, which should be less than 50.

Small amounts of crosslinking agents such as 0.01% to 2% may also be added to the recipe, e.g. divinyl benzene, diglycol dimethacrylate. They will tend to produce a tighter gel and a lower swelling index. The particle size of the polybutadiene is about 1,000 to 3,000 A. units. This rubber latex is then grafted with styrene monomer as given below:

The following ingredients are charged into a 10 gallon reactor:

Water—55 lbs.
Potassium hydroxide—95 g.
Stearic acid—490 g.
Polybutadiene latex—40 lbs.
Styrene—31 lbs.
Lauryl mercaptan—26 g.
Cumene hydroperoxide—100 g.
Potassium ferricyanide—1.5 g.

A normal emulsion polymerisation is carried out to achieve full conversion of the styrene. Then the latex is coagulated, filtered and dried as is well known in the art and this product is referred to in the succeeding examples as "Emulsion graft polyer B."

Preparation of vinyl aromatic copolymer

The following ingredients are charged into a 5 gallon reactor: water, 17½ lbs. Then a solution of surfactants is added which was made previously in a separate vessel:

|   | G. |
|---|---|
| Water | 4,000 |
| Dresinate 731 | 180 |
| Sodium dodecyl benzene sulphonate | 150 |

Then the monomers are added:

| Styrene | 5,625 |
|---|---|
| α-Methyl styrene | 1,875 |
| Tert-dodecyl mercaptan | 11.25 |
| Potassium persulphate | 15 |

The emulsion is reacted for 15 hours after which time complete conversion is obtained. Then the latex may be coagulated, filtered and dried, but it is a preferred method of this invention, not to coagulate either of the above-mentioned graft polymer and copolymer latices but to blend them together, and then coagulate the blend, filter and dry as is well known. This copolymer is hereinafter referred to as "Copolymer C."

Latex blend

Emulsion graft polymer—5 lbs.
Copolymer C—11 lbs.
Wingstay V (antioxidant)—4 ozs.

The two latices are blended together for 15 minutes, then the antioxidant is added and the mixture is stirred for another 15 minutes. The latex blend is then coagulated with 2% magnesium sulphate and 0.5% acetic acid in water at 80° C. The coagulum is then filtered and dried.

Final blend

The next stage is blending of the resins in a conical, Hobart or other type of blender. Additives such as pigments, dyestuffs, lubricants and stabilisers are also added at this stage. The three resins are charged into the blender in the following ratio:

Mass graft polymer—20 lbs.
Blended coagulum—55 lbs.
Antioxidant (Polygard)—6 ounces The blending is carried out for a sufficient time to achieve a homogeneous mix. Then the blender contents are discharged into a Buss Ko Kneader to obtain a homogeneous polymer. The temperature conditions in the Ko Kneader are adjusted to 160° C. to 190° C. The blended polymer is pelletized ready for further processing.

The pellets obtained as above described are moulded on a 2¼ ounce Hupfield injection moulding machine for the production of test pieces for the determination of physical properties.

The following physical properties were obtained (using the British Standard test methods described in British Standard Specification No. 3126).

Impact strength (¼" bar)—1.6 ft.-lbs./inch
Tensile yield strength—5,200 p.s.i.
Ultimate tensile strength—4,500 p.s.i.
Percent elongation—22%
Young's modulus—3.1×10⁵ p.s.i.
Flexural strength—7,400 p.s.i.
Flexural modulus—2.6×10⁵ p.s.i.
Softening point—106° C.

EXAMPLE 2

The following mixture was blended in a Hobart blender for 30 minutes:

```
                                                   Parts
Mass graft polymer _____ 20
Blend of coagulated emulsion graft polymer B and
    copolymer C _____ 80
Antioxidant (Polygard) _____ 0.5
```

The blend of B and C consisted of 60 parts of the α-methyl styrene copolymer and 20 parts of the emulsion graft polymer.

The final blend was charged into a Buss Ko Kneader and was extruded under similar conditions to those described in Example 1. Then it was extruded in a devolatilising extruder and pelletised and moulded on a 2½ ounce Hupfield injection moulding machine for the production of test pieces for the determination of physical properties.

The following physical properties were obtained by the test methods used in Example 1:

Impact strength (¾" bar)—1.2 ft.-lbs./inch
Tensile strength—5,600 p.s.i.
Young's modulus—3.4×10⁵ p.s.i.
Flexural strength—8,100 p.s.i.
Flexural modulus—2.9 p.s.i.
Softening point—107.5° C.

EXAMPLE 3

This example shows the effect of replacing the α-methyl styrene/styrene copolymer with normal polystyrene and preparing the blend with the mass polymerised polybutadiene graft polymer and the emulsion polymerised polybutadiene graft polymer. The blend is prepared in the same way as in the first example by blending first in the Hobart and then compounding in a Buss Ko Kneader.

```
Blend:                                              Parts
    Mass graft polymer A _____ 25
    Coagulated emulsion graft polymer B _____ 25
    Polystyrene _____ 50
    Antioxidant (Polygard) _____ 0.5
```

The physical properties of this blend tested as in Example 1 are the following:

Impact strength—1.9 ft.-lbs./inch
Tensile strength—5,000 p.s.i.
Young's modulus—3.1 p.s.i.
Flexural strength—7,300 p.s.i.
Flexural modulus—2.4 p.s.i.
Softening point—100° C.

EXAMPLE 4

In this example a ternary composition is prepared which shows outstanding gloss properties with respect to the mechanical properties. Normally, toughened polystyrenes show a decrease in gloss properties with increase in impact strength, i.e. with increased rubber content.

The following blend is prepared in the Hobart blender and then compounded in the Buss Ko Kneader and optionally devolatilized in a vacuum extruder:

```
                                                    Parts
Mass graft polymer A _____ 15
Coagulated emulsion graft polymer B _____ 35
Polystyrene _____ 50
Antioxidant (Polygard) _____ 0.5
```

Test pieces of this blend are prepared as before under standard conditions and the properties are compared with the standard mass graft polymer A:

|  | Mass graft polymer A | Ternary blend |
|---|---|---|
| Impact strength (¼" bar), ft., lbs./inch | 2.1 | 2.5 |
| Tensile yield strength, p.s.i. | 2,800 | 3,400 |
| Ultimate tensile strength, p.s.i. | 3,800 | 4,100 |
| Percent elongation, percent | 45 | 18 |
| Young's modulus, p.s.i. | 1.9 | 3.1 |
| Flexural strength, p.s.i. | 3,500 | 5,100 |
| Flexural modulus, p.s.i. | 1.6 | 2.5 |
| Softening point, ° C. | 94 | 96 |
| Surface gloss | (¹) | (²) |

¹ Moderate.  ² Very good.

This example shows the improvement obtained, particularly in surface gloss of injection moulded samples, when the ternary blend is used.

EXAMPLE 5

This ternary composition consists of higher proportions of the two graft polymers which result in improved impact strength properties of such a blend which are higher than it would be possible to achieve with any single type of graft polymer whilst maintaining the necessary flow properties and tensile modulus.

The following blend is made in the same way as in the first example:

| | Parts |
|---|---|
| Mass graft polymer A | 30 |
| Coagulated emulsion graft polymer B | 50 |
| Polystyrene | 20 |
| Antioxidant (Polygard) | 0.5 |

The following physical properties tested as in Example 1 were as follows:

Impact strength—6.5 ft. lbs./inch
Tensile yield strength—3,800 p.s.i.
Ultimate tensile strength—2,700 p.s.i.
Percent elongation—16%
Young's modulus—2.31 p.s.i.
Flexural strength—4,100 p.s.i.
Flexural modulus—1.8 p.s.i.
Softening point—92° C.

The ternary blends of the present invention show an unexpected combination of properties, namely good impact strength, tensile strength and a high softening point. Moreover, the surafce gloss of mouldings produced from the blend is quite outstanding for this type of material. This combination of properties is unattainable with any one of the three polymers or with a binary blend of any of the three polymers mentioned.

It is thought that the reason for the unexpected improvement in the physical properties is the presence of the two types of styrene graft polymers dispersed in the polystyrene-α-methyl styrene matrix, one polybutadiene graft polymer having a particle size distribution from 1,000 to 3,000 A. units, and the other polybutadiene graft having a particle size of 0.5 to 30 microns.

The first graft polymer preferably contains from 2 to 12% by weight of thhe high cis polybutadiene while the second graft polymer preferably contains from 10 to 80% by weight of said high trans polymer or diene hydrocarbon.

The new compositions of this invention are useful for the production of shaped articles by moulding, casting or extrusion in per se conventional manner. The said compositions are in fact improved high impact or toughened polystyrene compositions and are of similar utility to known toughened polystyrene.

I claim:
1. A new composition of matter consisting essentially of a homogeneous blend of
  (1) 15–70% of a first graft polymer prepared by mass polymerization of (1) a linear polybutadiene having a minimum cis isomer content of at least 30% with (2) a vinyl aromatic compound selected from the group consisting of styrene, nuclear alkyl and halogen-substituted styrenes and alpha-methyl styrene,
  (2) 15–70% of a polymer or copolymer of a vinyl aromatic compound selected from the group consisting of styrene, nuclear alkyl and halogen-substituted styrenes and alpha-methyl styrene and
  (3) 15–70% of a second graft copolymer prepared by emulsion polymerization of (1) a rubbery branched-chain polymer having a trans content above 60% prepared by emulsion polymerization of a diene hydocarbon with (2) a vinyl aromatic compound selected from the group consisting of styrene, nuclear alkyl and halogen-substituted styrenes and alpha-methyl styrene.

2. A composition of matter according to claim 1 wherein the second graft polymer is based upon a polybutadiene produced by emulsion polymerisation.

3. A composition of matter according to claim 1 wherein the vinyl aromatic compound copolymer is a copolymer of styrene with α-methyl styrene.

4. A composition of matter according to claim 1 wherein the second graft polymer and the polymer or copolymer of the vinyl aromatic compound are used in the form of a preblended mixture obtained by coagulation of emulsions of the graft polymer and the said polymer or copolymer.

5. A composition of matter according to claim 4 wherein said preblended mixture is obtained by coagulation of a mixture of latices of the said graft polymer and the said polymer or copolymer.

6. A composition of matter according to claim 1 wherein the first graft polymer contains from 2% to 12% by weight of said high cis-polybutadiene and the second graft polymer contains from 10% to 80% by weight of said high trans polymer of a diene hydrocarbon.

7. A compositionof matter according to claim 1 wherein the first graft polymer is in the form of particles of a size of from 0.5 to 30 microns and the second graft polymer is in the form of particles of a size of from 1000 to 3000 angstrom units both said graft polymers being dispersed in a matrix of a copolymer of styrene with α-methyl styrene.

References Cited

UNITED STATES PATENTS 3,288,887  1/1966  Yoshimo et al. _____ 260—880

FOREIGN PATENTS 963,307  7/1964  Great Britain _____ 260—880

MURRAY TILLMAN, Primary Examiner
C. J. SECCURO, Assistant Examiner

U.S. Cl. X.R.
260—880